United States Patent
Boregowda et al.

(10) Patent No.: US 7,613,328 B2
(45) Date of Patent: Nov. 3, 2009

(54) LABEL DETECTION

(75) Inventors: Lokesh R. Boregowda, Bangalore (IN); Anupama Rajagopal, Coimbatore (IN); Krishnamoorthy Dornadula, Bangalore (IN); Lalitha M. Eswara, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 623 days.

(21) Appl. No.: 11/223,885

(22) Filed: Sep. 9, 2005

(65) Prior Publication Data

US 2007/0058863 A1   Mar. 15, 2007

(51) Int. Cl.
*G06K 9/00* (2006.01)
(52) U.S. Cl. ........................ 382/105; 382/170
(58) Field of Classification Search ................. 382/105, 382/170
See application file for complete search history.

(56) References Cited

U.S. PATENT DOCUMENTS

| | | | | |
|---|---|---|---|---|
| 6,373,962 | B1 * | 4/2002 | Kanade et al. | 382/105 |
| 6,449,391 | B1 * | 9/2002 | Ku | 382/194 |
| 6,473,517 | B1 * | 10/2002 | Tyan et al. | 382/105 |
| 6,553,131 | B1 * | 4/2003 | Neubauer et al. | 382/105 |
| 7,317,830 | B1 * | 1/2008 | Gordon et al. | 382/173 |
| 2004/0218785 | A1 | 11/2004 | Kim | |

FOREIGN PATENT DOCUMENTS

EP   1085455   3/2001

OTHER PUBLICATIONS

Draghici S., "A neural Network Based Artificail Vision System For Licence Plate Recognition". Feb. 1997, World Scientific Publishing Company, vol. 8 No. 1, pp. 113-126.*
Gllavata et al., "A Text Detection, Locatlization and Segmentation System for OCR in Images", 2004, IEEE, pp. 310-317.*
Wang et al., "Detection and Recognition of License Plate Characters with Different Appearances", 2003, IEEE, pp. 979-984.*
Hsieh et al., "Morphology-based license plate detection in images of differently illuminated and oriented cars", 2002, Journal of Electronic Imaging, vol. 11(4), pp. 507-516.*
Liu et al., "Vehicle Detection with Projection Histograms and Type Recognition using Hybrid Neural Networks", 2004, IEEE, pp. 393-398.*
Salgado et al., "Automatic Car Plate Detection and Recognition Through Intelligent Vision Engineering", 1999, IEEE, pp. 71-76.*
Bai, Hongliang , et al., "A fast license plate extraction method on complex background", *2003 IEEE Intelligent Transportation Systems*, 2, (Oct. 12-15, 2003),985-987.
Dubuisson Jolly, M. P., et al., "Vehicle segmentation and classification using deformable templates", *IEEE Transactions on Pattern Analysis and Machine Intelligence*, 18(3), (Mar. 1996),293-308.

* cited by examiner

*Primary Examiner*—John B Strege
(74) *Attorney, Agent, or Firm*—Kris T. Fredrick (57) ABSTRACT

A system and a method to detect a label are described herein. The system and method are to extract a horizontal region of interest based on the image; to extract a vertical region of interest based on the image; and to identify presence of the primary label in the image from the horizontal region of interest and from the vertical region of interest.

21 Claims, 11 Drawing Sheets

Pre-Process Input Image
220

FIG. 3

Extract Horizontal Region
230

LABEL DETECTION

FIELD

The disclosed subject matter relates generally to the technical field of label detection.

BACKGROUND

With increasing emphasis being given to security in commercial and residential establishments, one of the security features may include object identification and/or authentication. The objects may include mobile objects, such as vehicles, and may include immobile objects, such as shipping containers. Authentication in the case of vehicles, for example, may be through an associated license plate or may be through labels on shipping containers, for example. Often, a security mechanism includes video data captured of the object, for example, at the entrance of a parking lot. The video data may be inspected by a user (e.g. security officer) to determine whether a particular object has been authenticated. This process may be time consuming and may be inadequate for today's security applications due to increasingly large numbers of vehicles and parallel paths to be monitored, in addition to the availability of security at specific locations.

The vehicle may also be identified and/or authenticated through use of a transmitter/receiver instrument placed within the vehicle. The transmitter/receiver instrument may lose power, may be lost or forgotten by the vehicle user, or may be subject to a variety of other reasons why the instrument does not operate properly.

BRIEF DESCRIPTION OF THE DRAWINGS

Embodiments of the present invention are illustrated by way of example and not limitation in the Figures of the accompanying drawings, in which like references indicate similar elements and in which.

DETAILED DESCRIPTION

According to one embodiment, a system and a method to detect a label of an object in an image are described. The system and method are to extract a horizontal region of interest based on the image; and then to extract a vertical region of interest from the horizontal region detected; and to identify presence of the label in the image from the horizontal region of interest and from the vertical region of interest.

In the following description, for purposes of explanation, numerous specific details are set forth in order to provide a thorough understanding of embodiments of the present invention. It will be evident, however, to one skilled in the art that embodiments of the present invention may be practiced without these specific details.

Figure 1A:
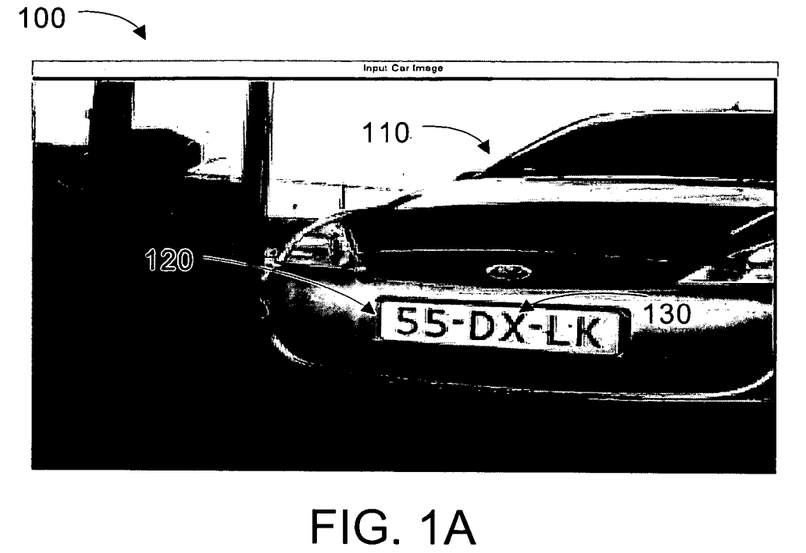
FIG. 1A illustrates an input image, according to an example embodiment of the present invention.

FIG. 1A illustrates an image 100 according to an example embodiment of the present invention. The image 100 may be from video data. The image 100 may include an object 110. The object 110 may include a label 120, for example, a license plate, a number plate, an identifier, and/or an identification/authorization plate. The label 120 may include at least one character 130. In this example shown, at least one character 130 includes an X.

The objects, such as vehicles, may be detected and/or authenticated as they are moved from and to designated areas, such as parking lots, or through an area, such as along a road or through a toll area. The authentication data may be used, for example, for law enforcement, data collection for a database, monitoring, and/or authorized entry (e.g. to specific reserved parking lots or to a toll road). The authentication data may also be used to automatically operate a gate or to keep a time record on the entry or exit of vehicles of interest for automatic payment calculations, for example.

In an embodiment, the object may either stop or slow down at the authentication point, such as an entrance or an exit, to adequately capture the video data. The object may be coerced into slowing down by, for example, speed bumps, narrowing roadways, a gate, or threat of fines if the vehicle does not wait for displayed acknowledgement of recognition.

Figure 1B:
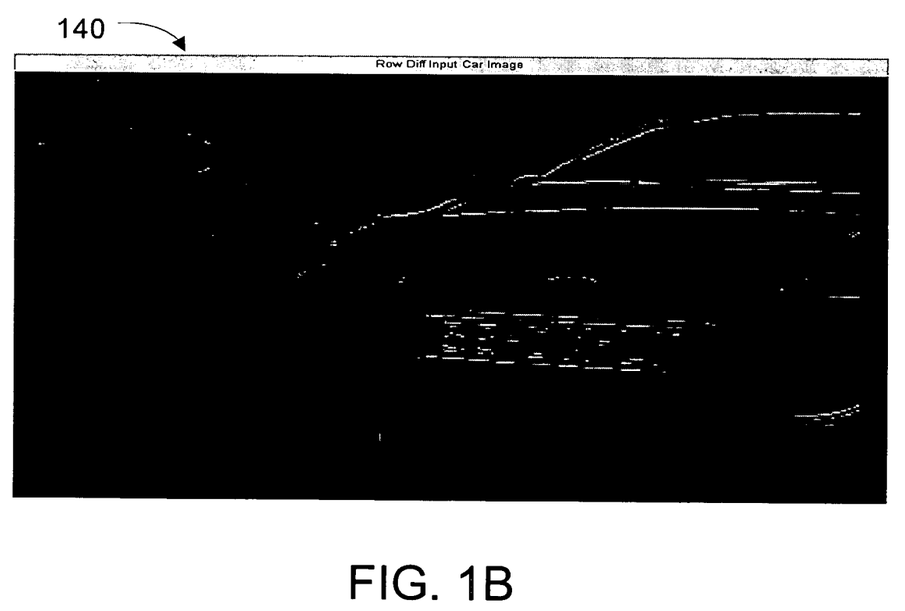
FIG. 1B illustrates a row difference image of the input image of FIG. 1A, according to an example embodiment.

FIG. 1B illustrates a row difference image 140 of the input image of FIG. 1A, according to an example embodiment.

Figure 1C:
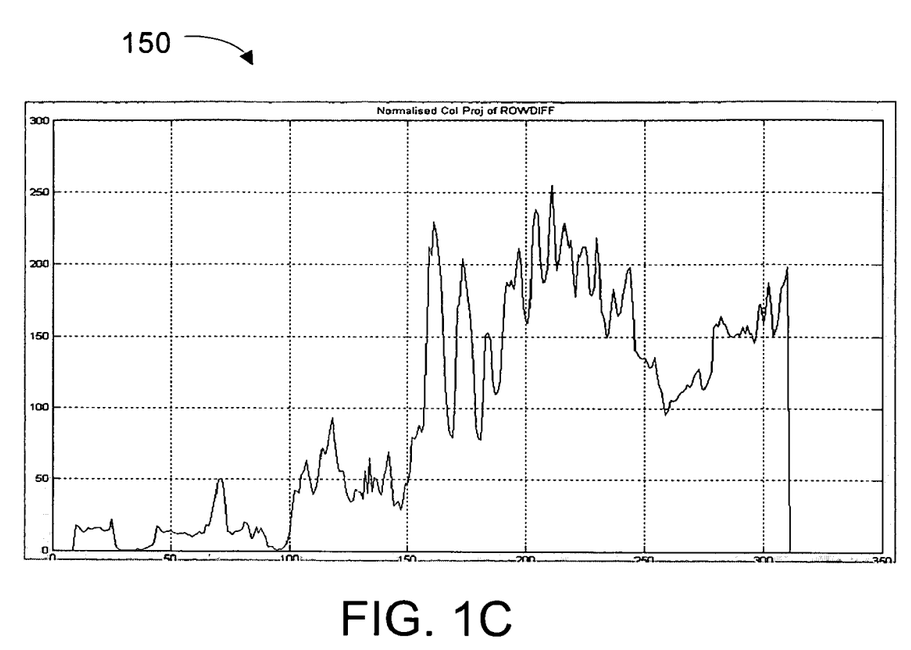
FIG. 1C illustrates a projection histogram of the row difference image of FIG. 1B, according to an example embodiment of the present invention.

FIG. 1C illustrates a projection histogram 150 of the row difference image of FIG. 1B, according to an example embodiment of the present invention. The histogram of FIG. 1C is a horizontal projection histogram.

Figure 1D:
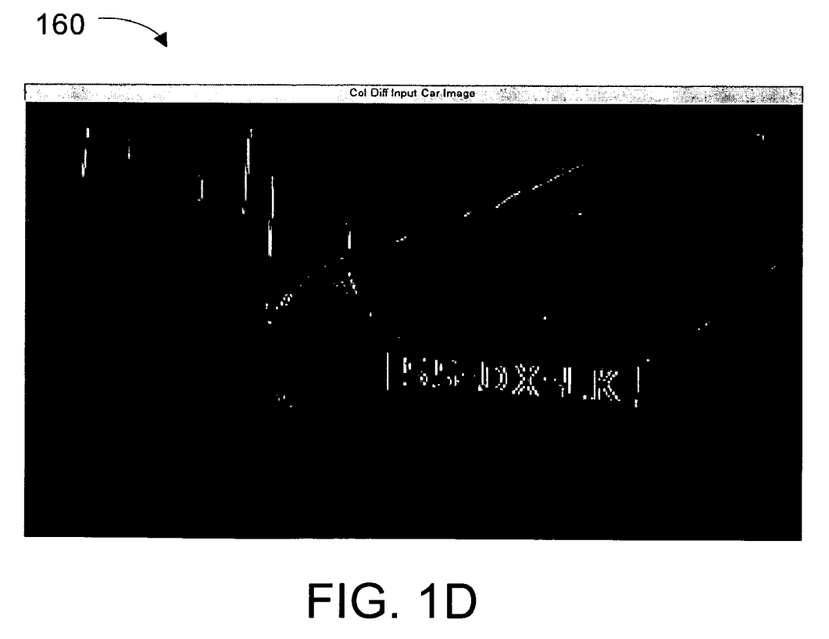
FIG. 1D illustrates a column difference image of the input image of FIG. 1A, according to an example embodiment.
Figure 1E:
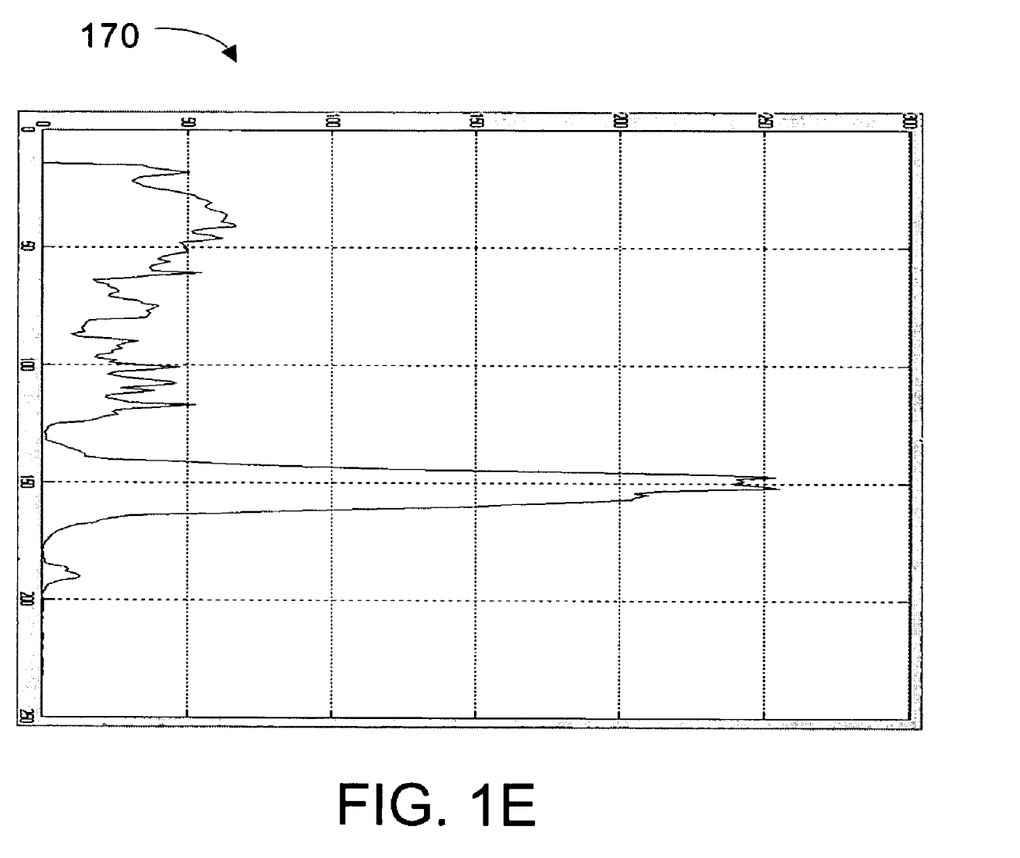
FIG. 1E illustrates a projection histogram of the column difference image of FIG. 1D, according to an example embodiment of the present invention.

The projection histogram 150 may include a vertical projection histogram 170 of a column difference image or a horizontal projection histogram 150 of the row difference image. FIG. 1D illustrates a column difference image 160 of the input image of FIG. 1A, according to an example embodiment. FIG. 1E illustrates a projection histogram 170 of the column difference image of FIG. 1D, according to an example embodiment of the present invention. The column difference image may be obtained by determining a difference between successive columns of the input image.

The projection histograms 150 and/or 170 may be used to detect the label 120. By using projection histograms applied on the gradient image, computations may be minimized as compared with other methods to detect the label 120. Further, by using projection histograms, the label may be accurately detected irrespective of the position, size, illumination and orientation (up to about 20 degrees) of the label 120 in the image/scene 100. Methods described herein include recognizing labels using object attributes, for example, orientation and position of the label.

Flowcharts

Figure 2:
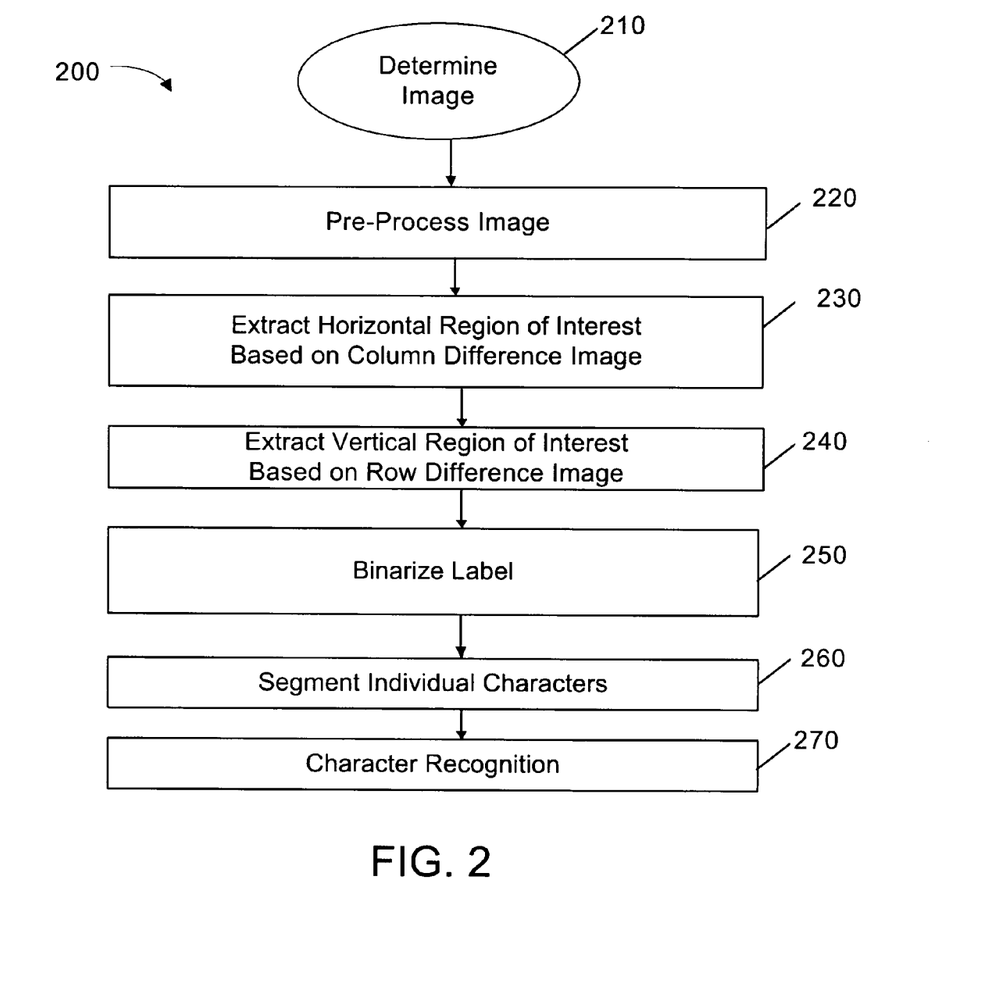
FIG. 2 illustrates a flow chart of a method, according to an example embodiment of the present invention.

FIG. 2 illustrates a flow chart of a method 200, according to an example embodiment of the present invention. The method 200 describes automatic label detection using the projection histogram 150 of the image gradient 140, in an embodiment. "Automatic" may refer to performing the method 200 with or without prompting from a system user.

The method 200 may include a multi-level analysis having stage by stage localization of the label 120 to authenticate the associated object. Video data of the object may be captured and processed in the method 200 to detect the object in the scene or image, to detect the label associated with the object (e.g. license plate), to segment a plurality of characters of the label, and to recognize the characters.

Figure 7A:
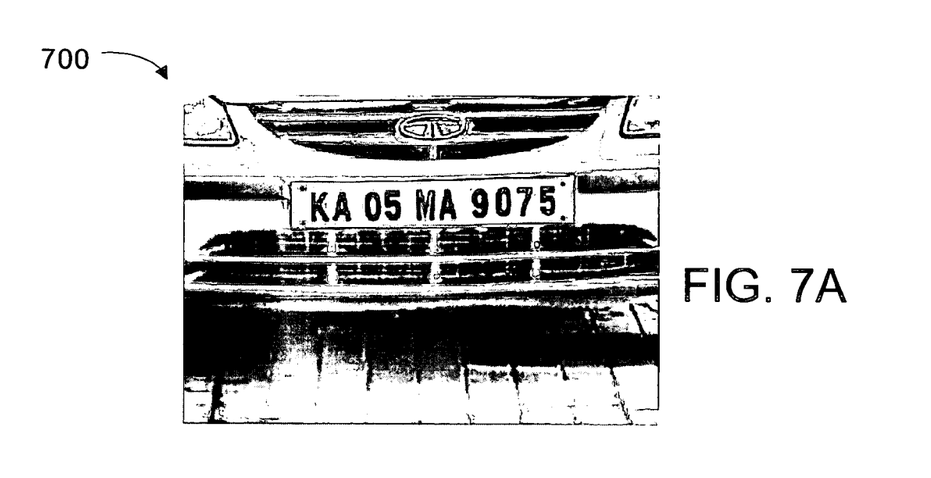
FIG. 7A illustrates an input image, according to an example embodiment of the present invention.

At block 210, the image may be determined. For example, the object may be detected in the image. For example, FIG. 7A illustrates an object (e.g. a vehicle) in an image. A camera may be placed at an entrance and/or an exit of a parking lot, for instance. The image captured by the camera may contain the license plate.

The image capture at a parking lot entrance may result in an image as shown in FIG. 7A.

At block 220, the image may be pre-processed. Additional details of the pre-processing may be found in more detail herein with regard to FIG. 3. The pre-processing may be considered a first stage.

Figure 7B:
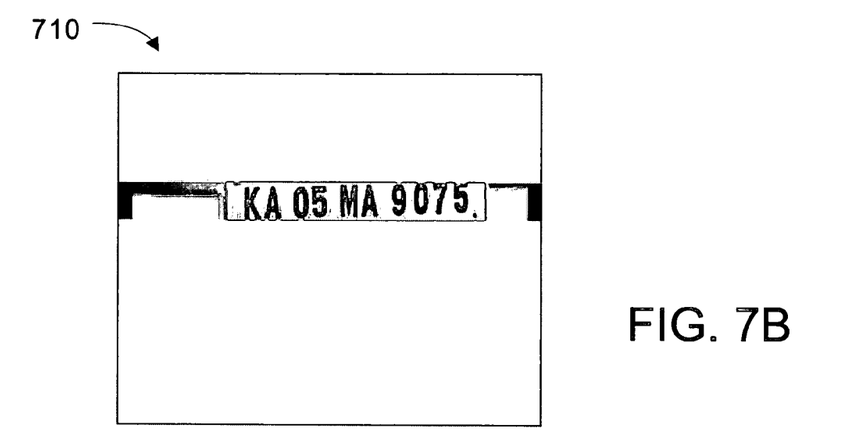
FIG. 7B illustrates the horizontal region of the identification/authorization plate of FIG. 7A, according to an example embodiment of the present invention.

At block 230, a horizontal region of interest may be extracted based on the column difference image. The horizontal region of interest may be a region associated with the label. This region may be extracted using the projection histogram 150 on the row difference image (e.g. gradient image) 140. FIG. 7B illustrates a horizontal region of interest, or a row strip 610 extracted according to block 230. The extraction of the horizontal region may be considered a second stage or a second level of analysis of the method 200. As described in more detail with regard to FIG. 4, the horizontal region is extracted using a normalized row projection histogram of a column difference image to locate a horizontal region including the label 120.

At block 240, a vertical region of interest is extracted based on the horizontal region of interest 230. The horizontal region of interest may be a region associated with the label, and may be a further extraction of the vertical region of interest to localize the image to the label. The extraction of the vertical region may be considered a third stage or a third level of analysis of the method 200. As described in more detail with regard to FIG. 5, the third level of analysis may be performed on the row strip (e.g. FIG. 7B) that includes the label. Either of two methods may be used to perform the vertical region of interest extraction and to further reduce the region associated with the label. The first method is described at blocks 510 to 530 of FIG. 5 and shown in FIGS. 7A to 7C, and the second method is described at blocks 540 to 570 of FIG. 5 and shown in FIGS. 8A to 8C.

At block 250, the label detected by blocks 230 and 240 is binarized, which means by incorporating an adaptive threshold, pixel values that are higher than this threshold are set to equal 1 and others are set to equal 0.

At block 260, individual characters in the binarized label may be segmented based on the connected components of detected label. A connected component analysis may be performed on the binarized image to extract the individual characters. A number of white pixels in the region may be counted, and neighborhood connectivity may be checked for.

At block 270, character recognition may be performed on the segmented individual characters. Any standard optical character recognition method may be used.

Figure 3:
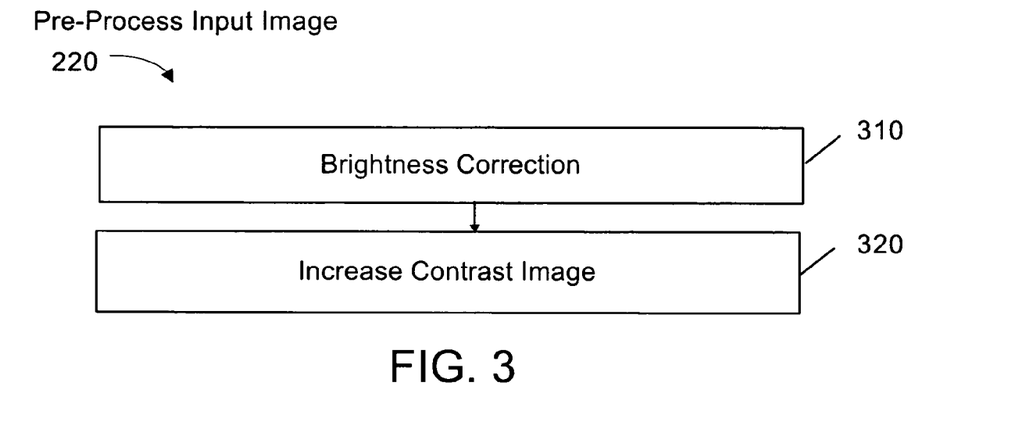
FIG. 3 illustrates a flow chart of a method that describes pre-processing of the input image, according to an example embodiment of the present invention.

FIG. 3 illustrates a flow chart of a method that describes pre-processing 220 of the input image, according to an example embodiment of the present invention. The pre-processing may remove distortion as a result of noise. The noise may be due to various reasons, such as accumulation of dust particles on the camera lens, and rain drops on the lens or the process associated with image capture itself.

At block 310, brightness correction may be performed on the image. The brightness variation may account for different illumination conditions. The brightness variation may be performed by adding a threshold value to each pixel value of the image. The threshold is the difference between 255 and the maximum pixel intensity value in the image.

At block 320, the contrast of the image may be increased. Increasing the contrast of the image may reduce detection of non-character regions of the label. In order to improve the contrast, the image is subjected to zero meaning. Zero meaning may refer to removing the mean value of the image from each of the pixel values, followed by histogram stretching. In histogram stretching, the histogram may be stretched to occupy the entire spectrum available, i.e., from 0 to 255. As a result, character detection errors may be minimized.

$$I(x, y) = \frac{255 * ((I(x, y) - \text{minVal})}{(\text{maxVal} - \text{minVal})}$$

where $1 \leq x \leq$ height, $1 \leq y \leq$ width, and "min Val" and "max Val" are the smallest and largest gray levels, respectively, in the image. I(x,y) refers to the pixel co-ordinate (x, y) in the image I, i.e., x=location of pixel under consideration along the X or horizontal direction; y=location of pixel under consideration along the Y or vertical direction. In the above calculation, the image values are scaled between 0 and 255.

In an example embodiment, the label may be assumed to lie in a bottom half of the image. In this instance, only the bottom half of the image is subjected to the pre-processed method 220. Before pre-processing, the image may be localized by removing one-fourth of the rows in a top part of the image, by removing one-eighth of the rows at a bottom part of the image, and by removing one-eighth of the columns at each side of the image. Localization may reduce computation and may thereby increase the system performance.

Figure 4:
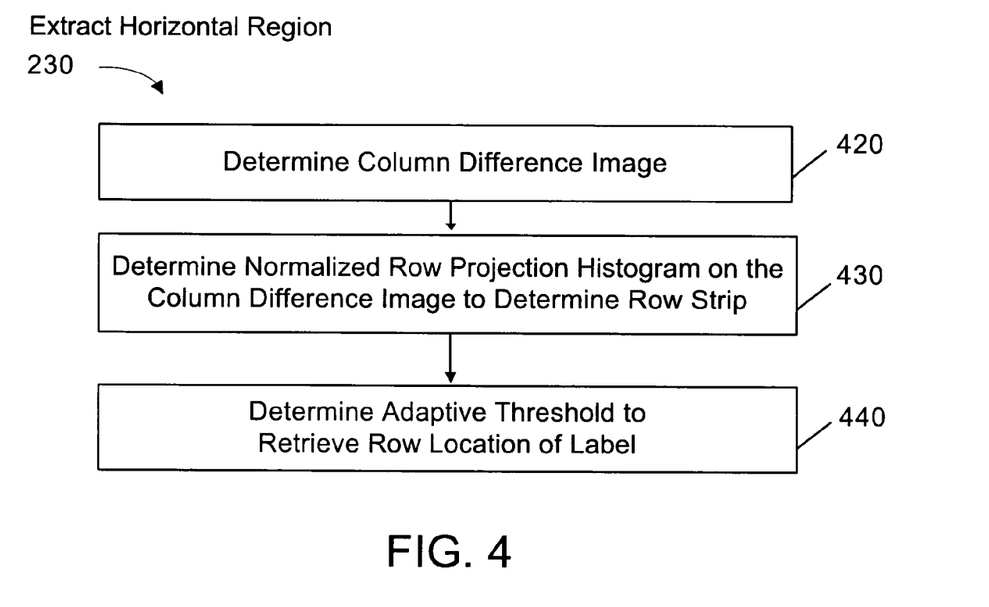
FIG. 4 illustrates a flow chart of a method that extracts a horizontal region of the input image having a label to be detected, according to an example embodiment of the present invention.

FIG. 4 illustrates a flow chart of a method 230 that extracts a horizontal region of the input image having a label to be detected, according to an example embodiment of the present invention.

At block 420, the column difference image is determined, which represents the image gradient as indicated in FIG. 1B.

At block 430, normalized row projection histogram of the block 420 is determined. The histogram may be as indicated in FIG. 1C. Normalization is obtained by dividing the row projection histogram by the number of rows. The result of this operation is to determine the row strip of the image that contains the label. The row strip is shown, for example, at FIG. 7B. Vertical edges may be more pronounced in the case of column difference images and hence the row projection histogram of this image may locate the vertical edges. The difference image analysis aids in bringing out edge information from the image.

The edge information may be distinct in the difference image Edges may be those pixels in the image where the intensity values of the images have large variation with respect to the surrounding pixels. Because the difference image may bring out this large variation, edge information may be distinct. Thus the difference image may locate the edges in the image, and may leave out the extra or remaining regions.

At block 440, an adaptive threshold is determined and used to retrieve a row location of the label in the image 100. The label detection involves many challenges, e.g. the label may be located anywhere within the image, and background illumination of headlights may interfere with label detection. Thus, adaptive threshold may be used in the histogram analysis to segment the label from the image. The adaptive threshold may be used for binarization of the row projection segmented image. The segmented image of block 430 includes the label and some surrounding regions. The adaptive threshold binarizes this segmented/image to aid in negating the effect of illumination of the label. The adaptive threshold may be selected based on the histogram profile of the segmented image. The adaptive threshold may be determined by simple histogram analysis of the extracted image. The adaptive threshold is not used to retrieve any row location here and may only be used for binarization of the image.

Figure 5:
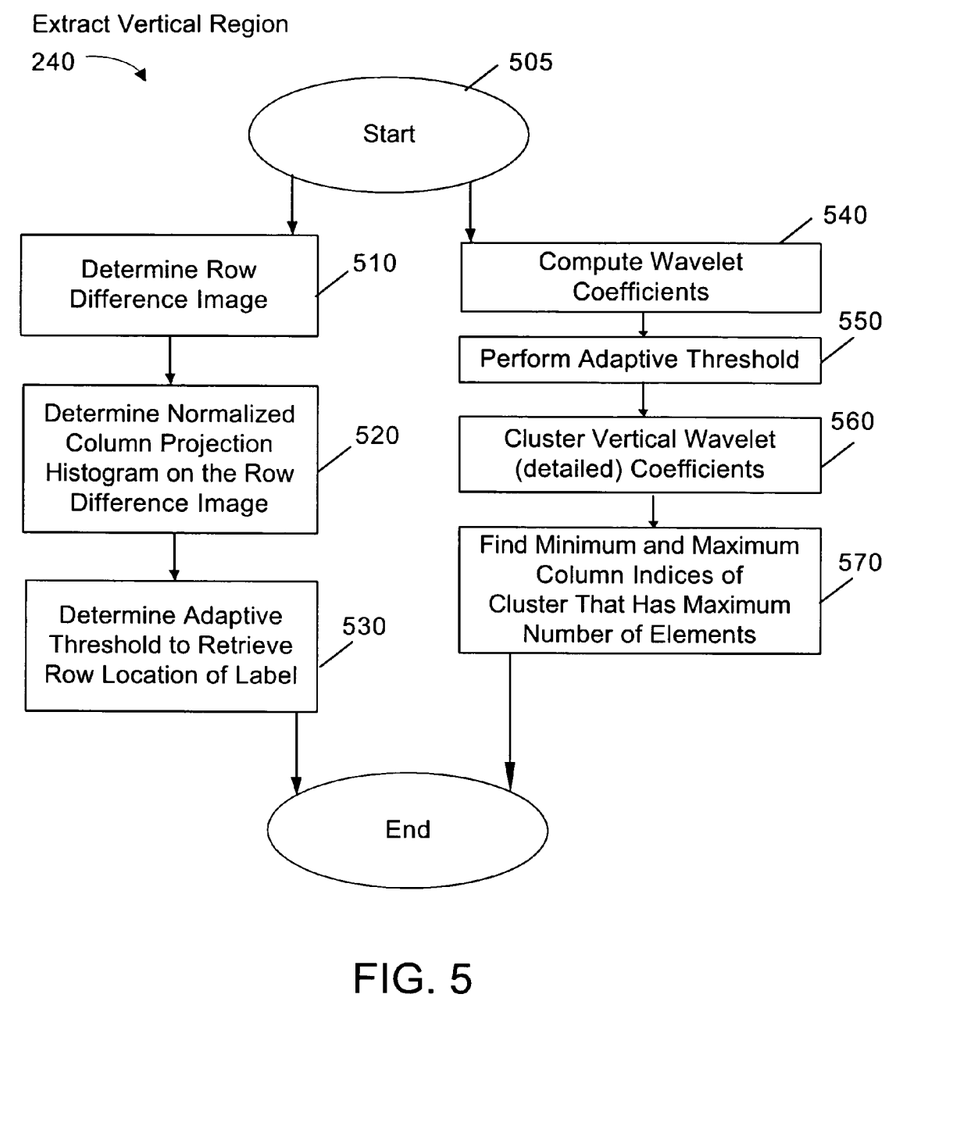
FIG. 5 illustrates a flow chart of a method, according to an example embodiment of the present invention, to extract a vertical region containing the identification plate.

FIG. 5 illustrates a flow chart of a method associated with the block 240, according to an example embodiment of the present invention, to extract or to locate the vertical region containing the identification plate.

At block 505, start the process. The method 240 branches to either the method of block 510 or the method of block 540. The third stage of analysis of the method 200 may use either of two methods.

Figure 7C:
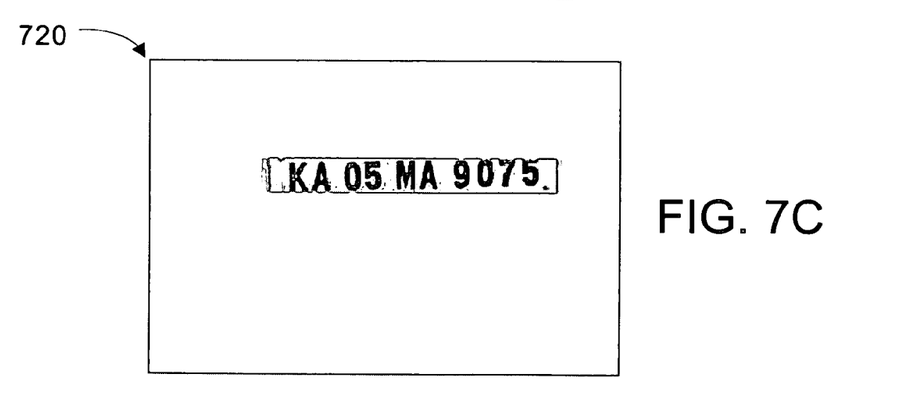
FIG. 7C illustrates the vertical strip of the horizontal region detected in FIG. 7B of the identification/authorization plate of FIG. 7A, according to an example embodiment of the present invention.

The first method uses normalized column projection histogram of the row difference image to prune the horizontal region, thus giving a much reduced search area. The resulting minimal image region is further pruned using an area analysis based decision, such as the adaptive threshold of block 530, rendering a limited region which primarily includes the label. The first method is described at blocks 510 to 530 of FIG. 5 and is shown in FIGS. 7A to 7C.

At block 510, the row difference image is determined.

At block 520, the normalized column projection histogram based on the row difference image may be determined. The histogram may be as shown in FIG. 1C.

The column projection histogram may locate the vertical edges. Vertical edges may be more pronounced in the case of row difference images. The difference image analysis aids in bringing out edge information from the image. Difference images are computed for rows and columns separately. A row wise difference image and a column wise difference image are each obtained for analysis.

At block 530, the adaptive threshold is determined, as described herein, to retrieve the row location of label. The localization of the label within the image may then be completed.

The described methods and systems may not use color information or contrast related information of the label. Therefore, the method may be robust to typical scene dependent variations, such as high contrast due to headlights, vehicle grills, reflection from windshields, varying backgrounds and different license plate sizes. Because color information has a least amount of relevance (and because character information dominates) to the region of the label, gray scale version or Y Channel version of the input image may be used. Because many license plates use two contrasting colors to represent characters and background (for example: white characters/letters/numbers on a black background, or black characters/letters/numbers on White/Yellow background), it may be sufficient to consider the luminance information (also referred to as Y Channel or brightness information). The luminance value or Y channel value may be computed from the original RGB color image using the following relation:

$Y=0.299 R+0.587 G+0.114 B$, where Y is computed for each pixel, and where, R, G and B values are the Red, Green and Blue color components of the pixel under consideration.

The method of extracting the horizontal region then ends.

Figure 8A:
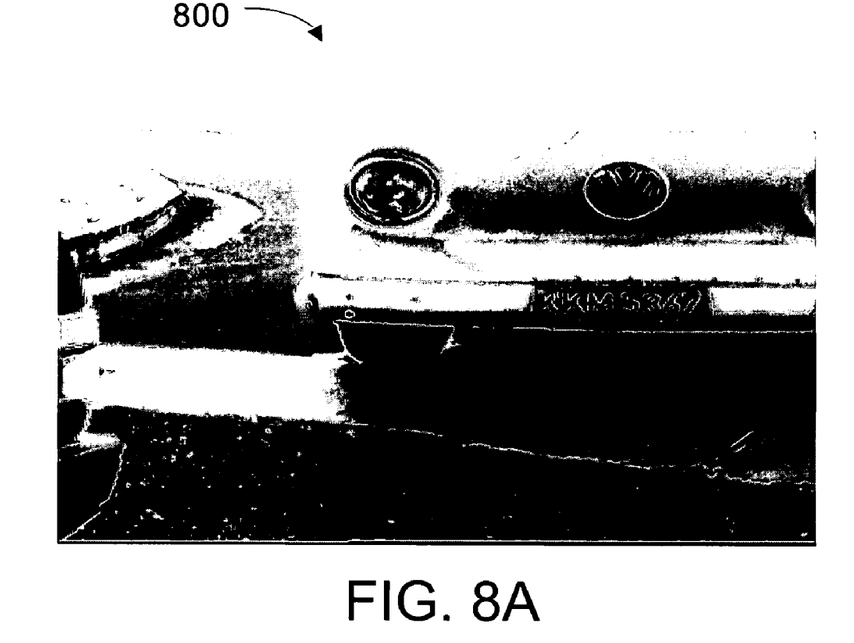
FIG. 8A illustrates an input image, according to an example embodiment of the present invention.
Figure 8B:
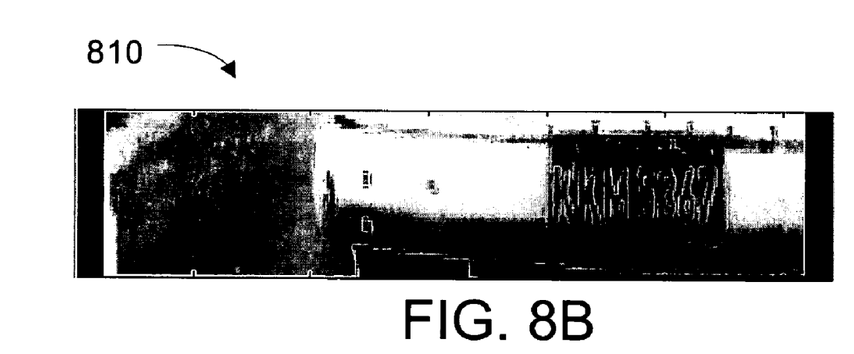
FIG. 8B illustrates the horizontal region of the identification/authorization plate of FIG. 8A, according to an example embodiment of the present invention
Figure 8C:
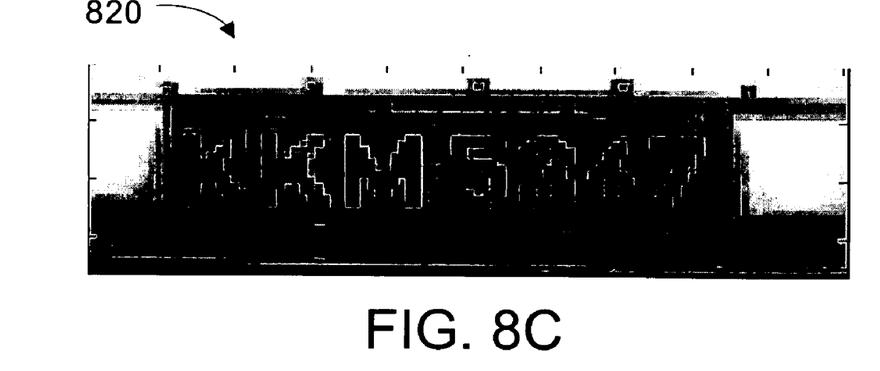
FIG. 8C illustrates the vertical strip of the horizontal region detected in FIG. 8B of the identification/authorization plate of FIG. 8A, according to an example embodiment of the present invention.

The second method starting at block 540 utilizes wavelet transform. Vertical detailed coefficients are pre-processed and then clustered. The clustering algorithm does not utilize a pre-set number of clusters. The index of the largest cluster present in the image renders the pruned label. The second method is described at blocks 540 to 570 of FIG. 5 and is shown in FIGS. 8A to 8C.

At block 540, wavelet coefficients using any standard wavelet transform may be determined. Illustration of approximate and detailed (vertical, horizontal and diagonal) components is shown and described with respect to FIGS. 6A to 6D.

At block 550, perform adaptive threshold as described herein.

Figure 6A:
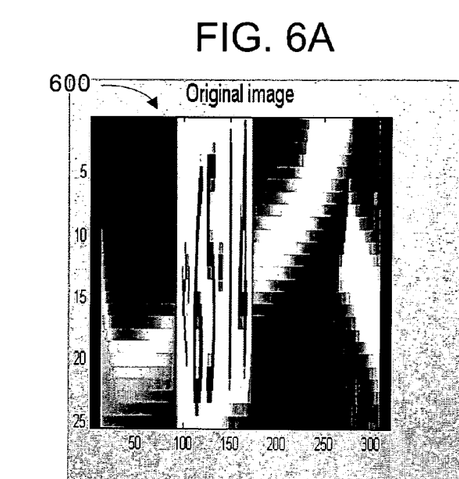
FIGS. 6A to 6D illustrate wavelet based analysis, according to an example embodiment of the present invention.
Figure 6B:
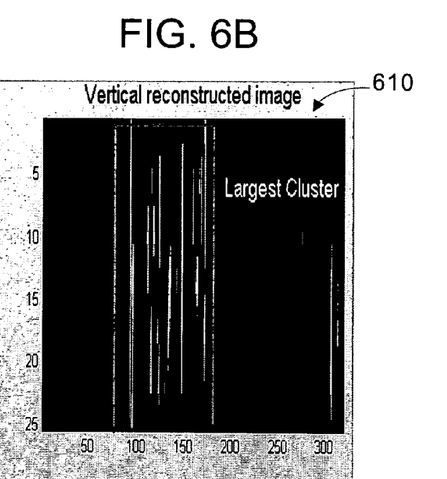

At block 560, vertical wavelet coefficients may be clustered as indicated with respect to FIG. 6B. These coefficients are pre-processed, e.g. threshold to $1/\sqrt{[2]}$ of maximum pixel intensity value of the coefficient image (FIG. 6B). Further, coefficients that are greater than the mean of the vertical coefficients sub-image are subjected to clustering. The number of clusters may not be pre-specified The clustering algorithm may include the following: If the spatial distance between two points in the sub-image is greater than a threshold that is calculated adaptively, then the two points are of a different cluster.

At block 570, the minimum and maximum column indices of cluster that has maximum number of elements may be determined based on the stored information, which contain the indices of the elements in the cluster. Once clustering is completed as indicated herein, the stored information includes the indices, hence the maximum and minimum indices may be taken as the label vertical position. The indices of the largest cluster render the indices of the columns of the row-strip input image. The row-strip image between the columns indicated renders the label. FIG. 8C shows the label extracted from the wavelet method described above, input to which is the row projected image.

The method of extracting the horizontal region then ends.

Figure 6C:
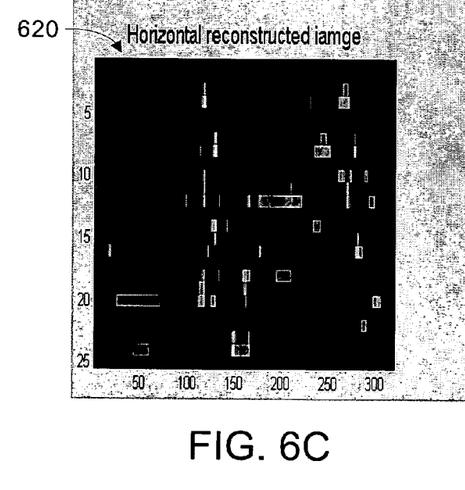
Figure 6D:
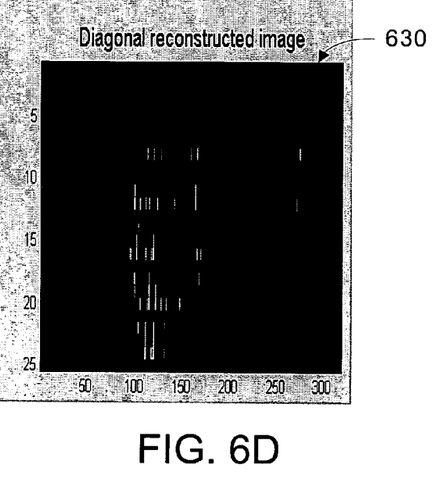

FIGS. 6A to 6D illustrate wavelet based analysis. FIG. 6A shows an original image at 2 levels of decomposition using the standard Daubechies wavelet with 4 coefficients. FIGS. 6B, 6C and 6D illustrate the vertical, horizontal and diagonal coefficients, respectively, of the example image of FIG. 6A. Any of the detailed coefficients (e.g., horizontal of FIG. 6C, vertical of FIG. 6B, and/or diagonal of FIG. 6D) may be used for processing at block 560.

Each tested wavelet coefficient, along with the cluster number and the row and column location in the image, is stored for further processing. A largest cluster 610, obtained from the image 600 of FIG. 6A, is illustrated in FIG. 6B from a column start point to a column end point to indicate the label.

Example Input Images and Detected Identification

FIG. 7A illustrates an input image 700 according to an example embodiment of the present invention.

FIG. 7B illustrates the horizontal region of the example detected identification label 710 of FIG. 7A, according to an example embodiment of the present invention, after row projection analysis of block 440.

FIG. 7C illustrates the vertical strip of the horizontal region detected in FIG. 7B of the identification/authorization plate of FIG. 7A according to an example embodiment of the present invention.

FIG. 7C illustrates an example detected identification label 720 of FIG. 7A, according to an example embodiment of the present invention, after column projection analysis of block 530.

FIG. 8A illustrates an input image 800 according to an example embodiment of the present invention.

FIG. 8B illustrates a horizontal region of an example identification/authorization plate 810 of FIG. 8A, according to an example embodiment of the present invention, after row projection analysis of block 440.

FIG. 8C illustrates the vertical strip of the horizontal region detected in FIG. 8B of the identification/authorization plate of FIG. 8A according to an example embodiment of the present invention.

FIG. 8C illustrates a vertical strip 820 of the horizontal region detected in FIG. 8B of the example detected identification plate 800 of FIG. 8A, according to an example embodiment of the present invention, after wavelet transform based analysis of block 570.

Figure 9A:
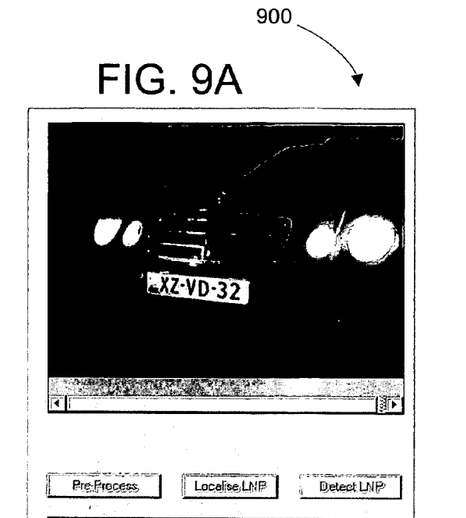
FIG. 9A illustrates an input image, according to an example embodiment of the present invention.

FIG. 9A illustrates an input image 900 according to an example embodiment of the present invention.

Figure 9B:
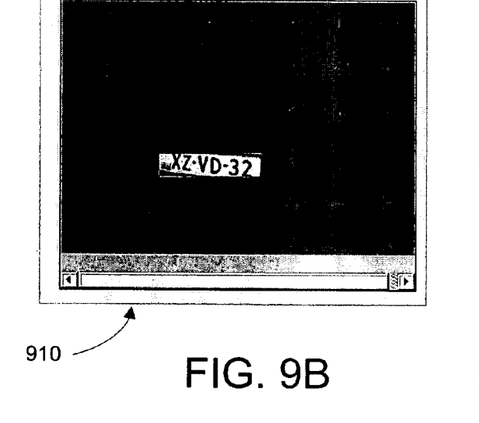
FIG. 9B illustrates an example detected identification plate of FIG. 9A, according to an example embodiment of the present invention.

FIG. 9B illustrates an example detected identification plate 910 of FIG. 9A according to an example embodiment of the present invention.

Figure 9C:
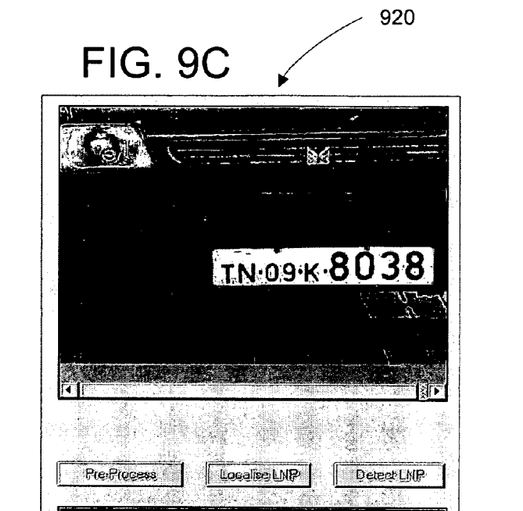
FIG. 9C illustrates an input image, according to an example embodiment of the present invention.

FIG. 9C illustrates an input image 920 according to an example embodiment of the present invention.

Figure 9D:
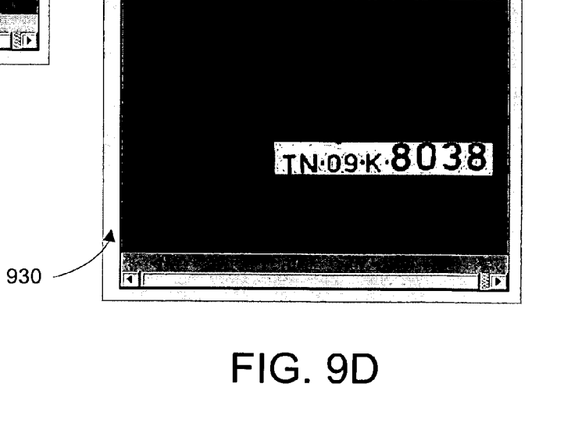
FIG. 9D illustrates an example detected identification plate of FIG. 9C, according to an example embodiment of the present invention.

FIG. 9D illustrates an example detected identification plate 930 of FIG. 9C according to an example embodiment of the present invention.

The label detection system may also be interactively used with biometric authentication systems (such as face authentication systems) along with an additional camera focused on the driver's face. The system described may include non-contact operation (e.g. wireless transmission to/from object) and may not add extra devices to the objects of detection. The described methods may be used as an add-on module with Honeywell® Legacy® video servers and/or systems, such as the DVM® and Rapid-Eye® to perform automatic license plate recognition.

Computer System

The described methods may be used in software, such as MATLAB and C++. The detection rates using the described methods may range up to about 90% to 95%.

Figure 10:
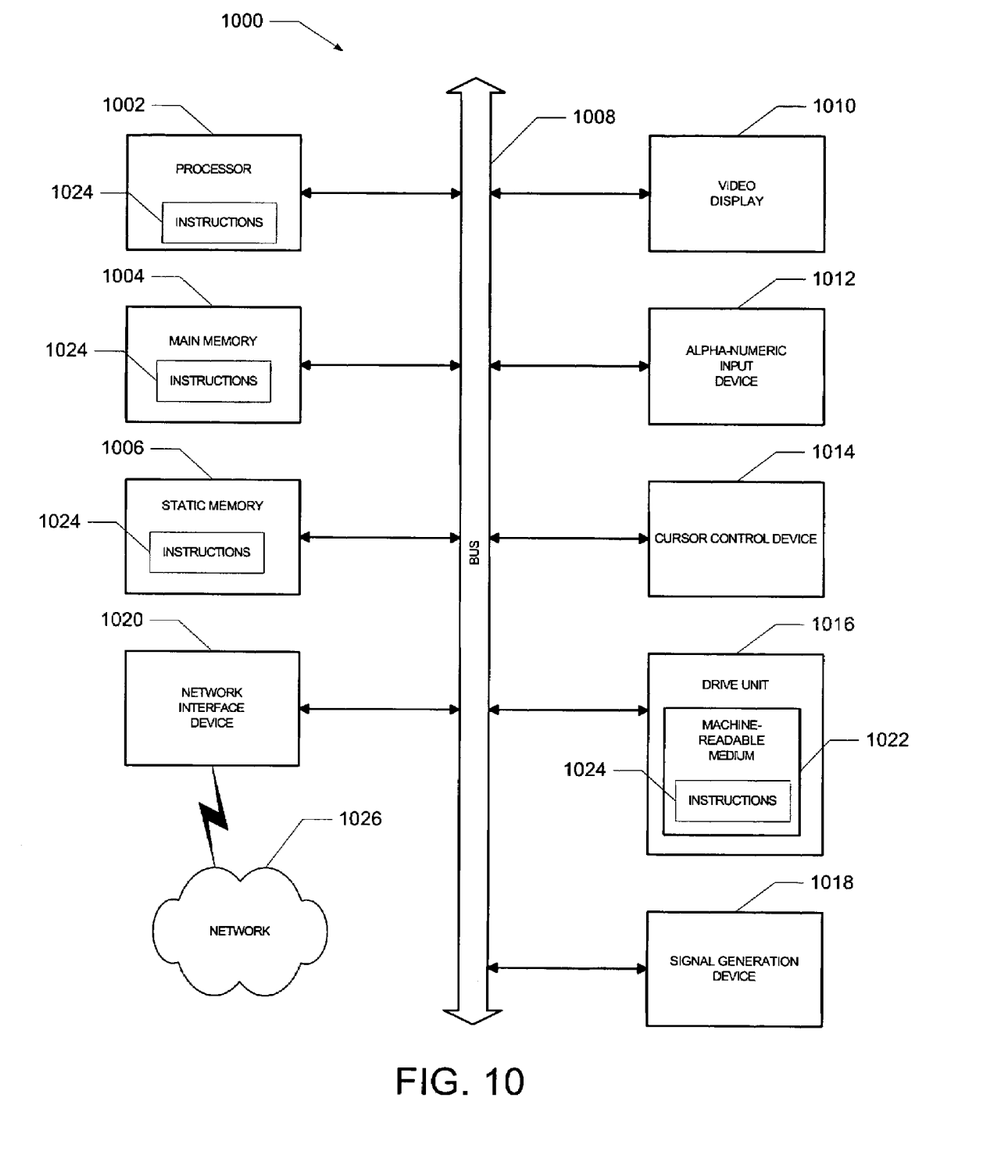
FIG. 10 illustrates a diagrammatic representation of a machine in the form of a computer system within which a set of instructions, for causing the machine to perform any one or more of the methodologies discussed herein, may be executed, according to an example embodiment.

FIG. 10 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 10 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, embodiments describe a method and a system to detect a label. Although embodiments of the present invention have been described with reference to specific example embodiments, it will be evident that various modifications and changes may be made to these embodiments without departing from the broader spirit and scope of embodiments as expressed in the subjoined claims.

What is claimed is:

1. A method to detect an identification label comprising:
using a processor for
determining an input image having an identification label;
processing the input image;
determining a column difference image;
determining a row projection histogram of the column difference image associated with the identification label;
processing a row projected image to extract a horizontal region associated with the identification label;
extracting a vertical region of interest associated with the identification label, wherein an index of a largest cluster present is used to extract the vertical region;
determining vertical wavelet coefficients using a wavelet transform and clustering the vertical wavelet coefficients;
wherein the extracting the horizontal region of interest is selected from a group including:
determining a column projection histogram of a row difference image associated with the identification label and processing a column projected image; and
using wavelet coefficient clustering of the row difference image.

2. The method of claim 1 further comprising:
identifying the identification label from the vertical region and from the horizontal region; and
performing character recognition on the identification label.

3. The method of claim 1 wherein using the wavelet coefficient clustering includes preprocessing vertical detailed coefficients and clustering the vertical detailed coefficients.

4. The method of claim 1 wherein processing the input image is selected from a group including image enhancement, brightness correction, and contrast correction.

5. A method to identify presence of a primary label in an image comprising:
using a processor for
extracting a vertical region of interest based on the image using projection histogram analysis and an index of a largest cluster present;
extracting a horizontal region of interest based on the image using projection histogram analysis;
determining vertical wavelet coefficients using a wavelet transform and clustering the vertical wavelet coefficients; and
identifying presence of the primary label in the image from the horizontal region of interest and from the vertical region of interest.

6. The method of claim 5 wherein extracting the horizontal region of interest based on the image includes column difference image analysis and row projection histogram analysis.

7. The method of claim 5 wherein extracting the vertical region of interest based on the image includes row difference image analysis and column projection histogram analysis.

8. The method of claim 5 wherein extracting the vertical region of interest based on the image includes wavelet coefficient clustering.

9. The method of claim 5 further comprising pre-processing the image to enhance the primary label before extracting the vertical region of interest.

10. The method of claim 9 wherein the pre-processing is selected from a group including brightness correction and contrast correction.

11. The method of claim 9 wherein the pre-processing includes:
subjecting the image to zero meaning; and
stretching the histogram.

12. The method of claim 5 wherein the primary label includes an orientation of up to about 20 degrees from a horizontal.

13. A tangible machine-readable storage medium storing a sequence of instructions that, when executed by a computer, cause the computer to perform a method of identifying presence of a primary label in an image, the method comprising:
- extracting a vertical region of interest based on an image using projection histogram analysis and an index of a largest cluster present;
- extracting a horizontal region of interest based on the image using projection histogram analysis;
- determining vertical wavelet coefficients using a wavelet transform and clustering the vertical wavelet coefficients; and
- identifying presence of a primary label in the image from the horizontal region of interest and from the vertical region of interest.

14. A method comprising:
using a processor for
- detecting a vehicle in an image;
- extracting a vertical region of interest based on the image using projection histogram analysis and an index of a largest cluster present;
- determining vertical wavelet coefficients using a wavelet transform and clustering the vertical wavelet coefficients;
- detecting a license plate of the vehicle using the projection histogram analysis on a gradient image;
- segmenting characters of the plate; and
- recognizing the characters.

15. The method of claim 14 further comprising locating presence of characters in the primary label.

16. The method of claim 15 wherein the image is selected from a group including a gray scale image version and a Y channel image version.

17. A system to identify a label in an image comprising:
- means for extracting a vertical region of interest based on the image using projection histogram analysis and an index of a largest cluster present;
- means for extracting a horizontal region of interest based on the image using projection histogram analysis;
- means for determining vertical wavelet coefficients using a wavelet transform and clustering the vertical wavelet coefficients; and
- means for identifying presence of the label in the image from the horizontal region of interest and from the vertical region of interest.

18. The system of claim 17 wherein the image includes an object having the label, wherein the system requires the object to slow down and/or stop when the image is taken.

19. The system of claim 17 wherein means for extracting the vertical region includes removing one-fourth of a row in a top part of the image, removing one-eighth of a row at a bottom part of the image; and removing one-eighth of columns at both sides of the image.

20. The system of claim 17 wherein means for extracting the horizontal region includes an adaptive threshold to determine substantially exact row location where the label is present.

21. The system of claim 17 wherein means for extracting the vertical region uses row differencing and includes an adaptive threshold to prune the image to substantially exact columns.

* * * * *